US008370247B2

(12) United States Patent
Winbom

(10) Patent No.: US 8,370,247 B2
(45) Date of Patent: Feb. 5, 2013

(54) MULTI SITE SOLUTION FOR SECURITIES TRADING

(75) Inventor: Håkan Winbom, Sollentuna (SE)

(73) Assignee: OMX Technology AB, Stockholm (SE)

( * ) Notice: Subject to any disclaimer, the term of this patent is extended or adjusted under 35 U.S.C. 154(b) by 1311 days.

(21) Appl. No.: 10/777,219

(22) Filed: Feb. 13, 2004

(65) Prior Publication Data

US 2005/0182704 A1   Aug. 18, 2005

(51) Int. Cl.
*G06F 17/60* (2006.01)
(52) U.S. Cl. ............................ 705/37; 705/35; 705/36 R
(58) Field of Classification Search .................... 705/35, 705/36 R, 37
See application file for complete search history.

(56) References Cited

U.S. PATENT DOCUMENTS

| | | | |
|---|---|---|---|
| 5,038,284 A * | 8/1991 | Kramer ............................ 705/37 |
| 5,230,048 A * | 7/1993 | Moy ..................................... 1/1 |
| 5,715,453 A * | 2/1998 | Stewart ........................ 715/207 |
| 5,873,071 A * | 2/1999 | Ferstenberg et al. ....... 705/36 R |
| 5,987,419 A | 11/1999 | Hachino et al. |
| 6,052,797 A * | 4/2000 | Ofek et al. ......................... 714/6 |
| 6,173,377 B1 * | 1/2001 | Yanai et al. .................... 711/162 |
| 6,463,454 B1 * | 10/2002 | Lumelsky et al. ............. 718/105 |
| 6,587,970 B1 * | 7/2003 | Wang et al. .................. 714/47.2 |
| 6,640,244 B1 * | 10/2003 | Bowman-Amuah .......... 709/207 |
| 6,662,195 B1 * | 12/2003 | Langseth et al. ...................... 1/1 |
| 7,171,401 B2 | 1/2007 | Tanaka |
| 7,305,362 B2 * | 12/2007 | Weber et al. ................. 705/36 R |
| 2004/0093555 A1 * | 5/2004 | Therrien et al. .............. 714/805 |
| 2006/0020646 A1 * | 1/2006 | Tee et al. ....................... 707/205 |

FOREIGN PATENT DOCUMENTS

| | | |
|---|---|---|
| JP | 6-301707 | 10/1994 |
| JP | A 6 301707 | 10/1994 |
| JP | 08249281 | 9/1996 |
| JP | 8249281 | 9/1996 |
| JP | A 11 134207 | 5/1999 |
| JP | 2002-297898 | 10/2002 |
| JP | A 2002 297898 | 10/2002 |

OTHER PUBLICATIONS

D. Rasseneur and Ph. Richard; "New, High Availability Telecommunication Systems and Servers;" Alcatel Telecommunications Review; Alcatel, Paris Cedex, FR, 1999, XP007005306; ISSN: 1267-7167; pp. 19-27.
International Search Report mailed May 31, 2005 in corresponding PCT Application PCT/EP2004/053294.
Australian Patent Office Search Report (3 pages) and Written Opinion (4 pages), Mar. 2, 2007.

(Continued)

*Primary Examiner* — Thomas Dixon
*Assistant Examiner* — Gerald Vizvary
(74) *Attorney, Agent, or Firm* — Nixon & Vanderhye P.C.

(57) ABSTRACT

Securities are traded at a primary site according to information received from market makers and traders. The information, including quotes and orders for one or more instruments, is received and stored at the primary site and used to create deals in the securities. The deals are also stored at the primary site. A secondary site stores replicas of the orders and deals, but not quote information. The deals stored at the secondary site may be used to update the orders stored at the secondary site.

20 Claims, 4 Drawing Sheets

OTHER PUBLICATIONS

Rasseneur, D. et al., "New, High Availability Telecommunication Systems and Servers", Alcatel Telecommunications Review, Alcatel, Paris Cedex, FR, 199, XP007005306, ISSN: 1267-7167, p. 22 col. 2 —p. 24 col. 1, fig. 6.

Translation of Japanese Official Action, Apr. 13, 2010, in corresponding Japanese Application No. 2006-552477.
Summary of Japanese official action, Sep. 13, 2010, in corresponding Japanese Application No. 2006-552477.

* cited by examiner

MULTI SITE SOLUTION FOR SECURITIES TRADING

TECHNICAL FIELD

The present invention relates to the trading of financial instruments, also referred to as securities, or similar entities. The invention facilitates the trading of securities and similar entities at a primary site with the use of a secondary site referred to as a "fail-over" site.

BACKGROUND

Commonly, and especially in view of recent events, systems for trading of financial instruments use a primary site for the trading, and utilize one or more replicate sites which can be designated as the new primary site if the primary site should crash or malfunction for some reason. Such replicate sites are often referred to as "fail-over" sites. In the event of a malfunction at the primary site, one of the replicate sites can be activated and start to act as a primary site, in some cases following a start-up procedure at the secondary site. Naturally, it is desired that the start up of the fail-over site, and its ability to act as a primary site, should take as little time as possible.

Conventionally, the maintaining of secondary or so called "fail-over" sites with short start-up time has been accomplished by transferring all the information used at the primary site to the secondary site. This solution has also been attractive in view of the fact that systems which support such a function are commercially available.

However, a problem in this context is that the sheer volume of information used in some trading systems is such that, for practical reasons, the information can only be transferred short distances. In view of the fact that one of the reasons for maintaining back-up sites is the ability to survive major disasters, there is a natural desire to keep a certain minimum geographical distance between the sites.

Thus, there is a conflict between the need for keeping the data transfer distances short, which would mean keeping the distance between the primary and secondary sites short, and the desire to keep a relatively large distance between the primary and secondary sites, in order to expose only one of them to the impact of a major disaster.

SUMMARY

As stated above, in a system for trading of financial instruments or securities, where the trading is normally carried out at a primary site, there is a desire and a need for maintaining at least a secondary ("fail-over") site which, with a minimal start time, can take over the function of the primary site in the event of a systems failure or some other malfunction or disaster at the primary site.

This need is addressed by the disclosed method for trading in financial instruments at a primary site, where the trading is carried out according to information received from so called market makers and traders.

The information which is received comprises so called quotes and orders (terms which will be more closely defined in the following detailed description) for one or more instrument, and according to the method of the invention, said information is received and stored at the primary site, and used there to create deals in said instruments. In addition, said deals are also stored at the primary site, and a secondary site stores replicas of the orders and deals are stored, with the deals stored at the secondary site being used to update the orders stored at the secondary site.

Because the vast majority of the information received and stored at a primary site is the so called quotes, only reduced information needs to be transferred to the secondary (and/or tertiary) site, thus enabling a greater geographical separation than has hitherto been possible. Example details are set forth in the following detailed description.

In addition, the transaction rate at the primary site, site "A", can be significantly increased if the system relies on "A" to receive confirmation from the secondary site, site "B", regarding the transfer of information.

An additional advantage is cost-saving, since the bandwidth necessary between sites "A" and "B" can be reduced significantly.

DETAILED DESCRIPTION

The following is a list of terms and how they are to be perceived in this description:

Order: an instruction to make a transaction, i.e. to buy or sell a certain amount of a specific instrument (or other entity, where and if applicable) at a given price. Orders are usually received from "investors", i.e. private investors or stock brokers.

Market Maker: A party usually contracted by the operator of the trading system, for example a stock exchange, to maintain both buy and/or sell prices (and volumes) in the trading system for certain instruments. There may be some restrictions to this, e.g. that buy and sell prices should not differ more than a certain percentage.

Quote: an instruction to a trading system or an exchange containing both buy and sell bids for one or more instruments. Usually issued by market makers, and usually updated quite frequently, making them transient in time.

Deal: a match between orders and/or quotes, comprising at least two trades (one buy, one sell) which make up the "legs" of the deal.

Order book: a table or a list in a trading system or an exchange etc, comprising all buy and sell orders, as well as all quotes.

Figure 1A:
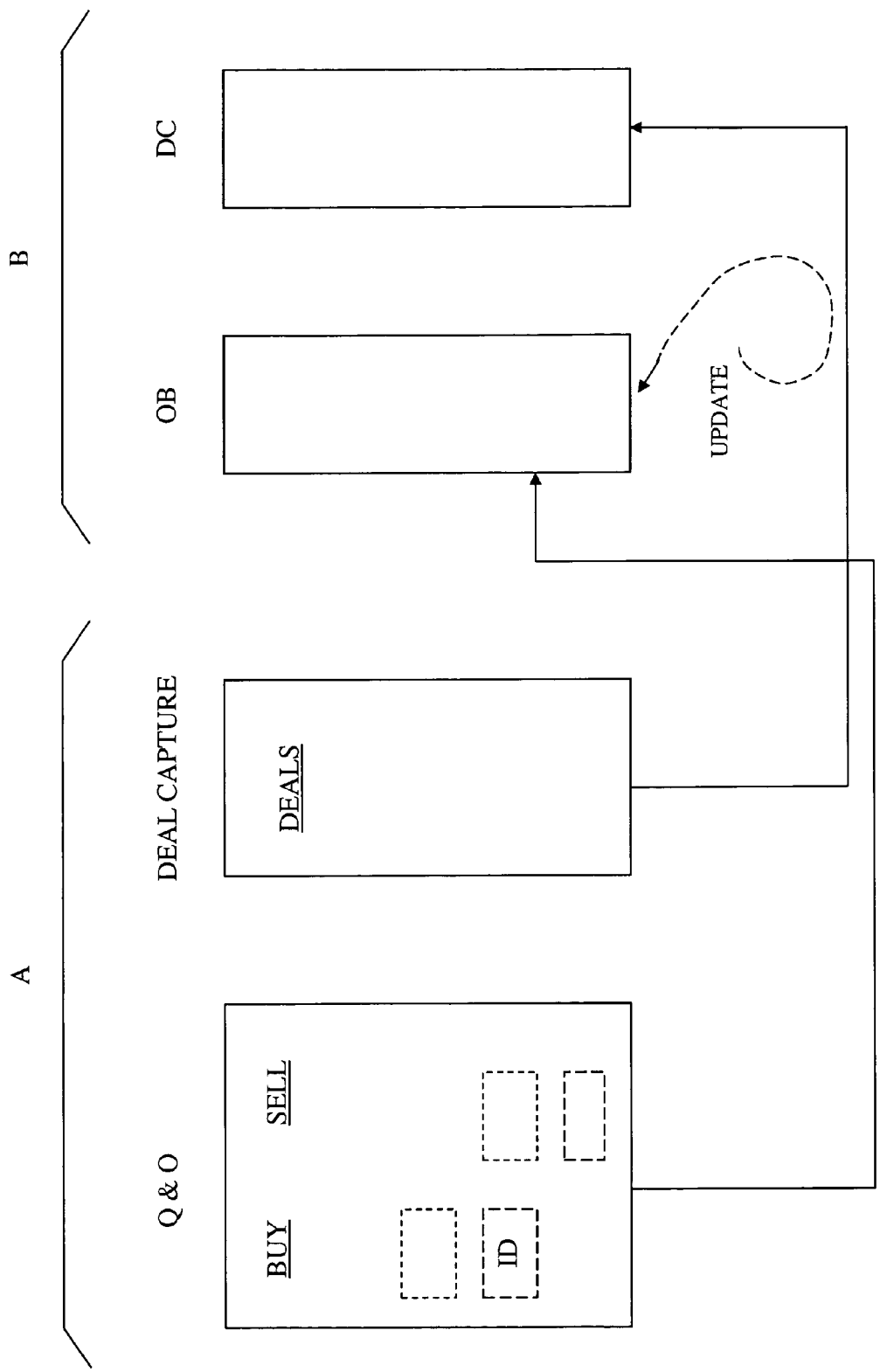
FIGS. 1a and 1b show a schematic overviews of systems using different example embodiments.

Turning now to FIG. 1a, there is shown an example system in which the technology can be used. The system in FIG. 1a comprises a primary exchange site, referred to as "A", and a fail-over or secondary site referred to as "B". However, it should be mentioned that although only one fail-over site is referred to throughout this description, and shown in the drawings, the technology can be applied to a system with two or more such sites.

At the primary site "A", quotes are received from market makers, the quotes being stored in the system until they expire. Quotes are typically updated very frequently by Market Makers, either manually or through programmed applications. In FIG. 1a, two quotes from market makers are shown, with different kinds of broken lines. Naturally, two is not a limit on the amount of quotes from market makers in the system; the number of quotes shown is merely kept at a minimum in the drawing for reasons of clarity.

Since a quote usually comprises both buy and sell orders, these are shown in respective columns in the so called order book (Q & O) of site "A" in FIG. 1a.

Also shown in one of the quotes is the term "ID", referring to the quote ID, which comprises the parameters used in a quote, such as price, volume and identity of the instrument (or other entity) to which the quote refers. This or similar information is also comprised in orders described in the next paragraph.

In addition to quotes, the order book in "A" also comprises orders to buy and/or sell. Orders are usually received by the trading system from private investors or brokers. If an order matches a quote or another order (or if the "sell" side in one quote matches the "buy" side of another quote), a deal is made, usually by an automated function in the system. It could be mentioned here that the vast majority of the functions in the system are automated, and usually implemented on one or several computers.

The deal which has occurred due to such a match is then stored at site "A", in a list shown in FIG. 1a with the heading of "Deal Capture". The details of the deal will comprise a quote-ID and (where applicable) an order-ID, as well as for example, volume, price, identity of the instrument traded, and the identity of the buyer and the seller.

As mentioned previously, the quotes received by the system have a limited "life span", since they are updated frequently by the Market makers. This, in combination with the large amount of instruments traded with in some moderns systems, will lead to a very high number of quotes per second. Thus, when all the information comprised in "A" is transferred to another site, "B", for use as a secondary or "failover" site, the amount of information which is be transferred is be very large. If it is desired to transfer said information from A to B rapidly, in order to enable sites A and B to be "in step" with one another, this, for practical reasons, would in turn create a necessity for keeping sites "A" and "B" close to one another, something which it is desired to avoid, since one and the same system failure or major disaster might otherwise affect more than one site.

However, there is also a great desire to minimize the time needed to activate site "B" as the primary site, if site "A" goes down for some reason. A solution to this shown schematically in FIG. 1a: at the secondary site, site "B", replicas or duplicates of the orders and deals received and/or made at site "A" are stored. However, no replicas or duplicates of the quotes received at site "A" are stored at site "B". As will be explained more closely below, if site "B" is activated to function as the primary site, the information retained at "B" will suffice to enable "B" to become the new primary site within a very short time span.

Figure 1B:
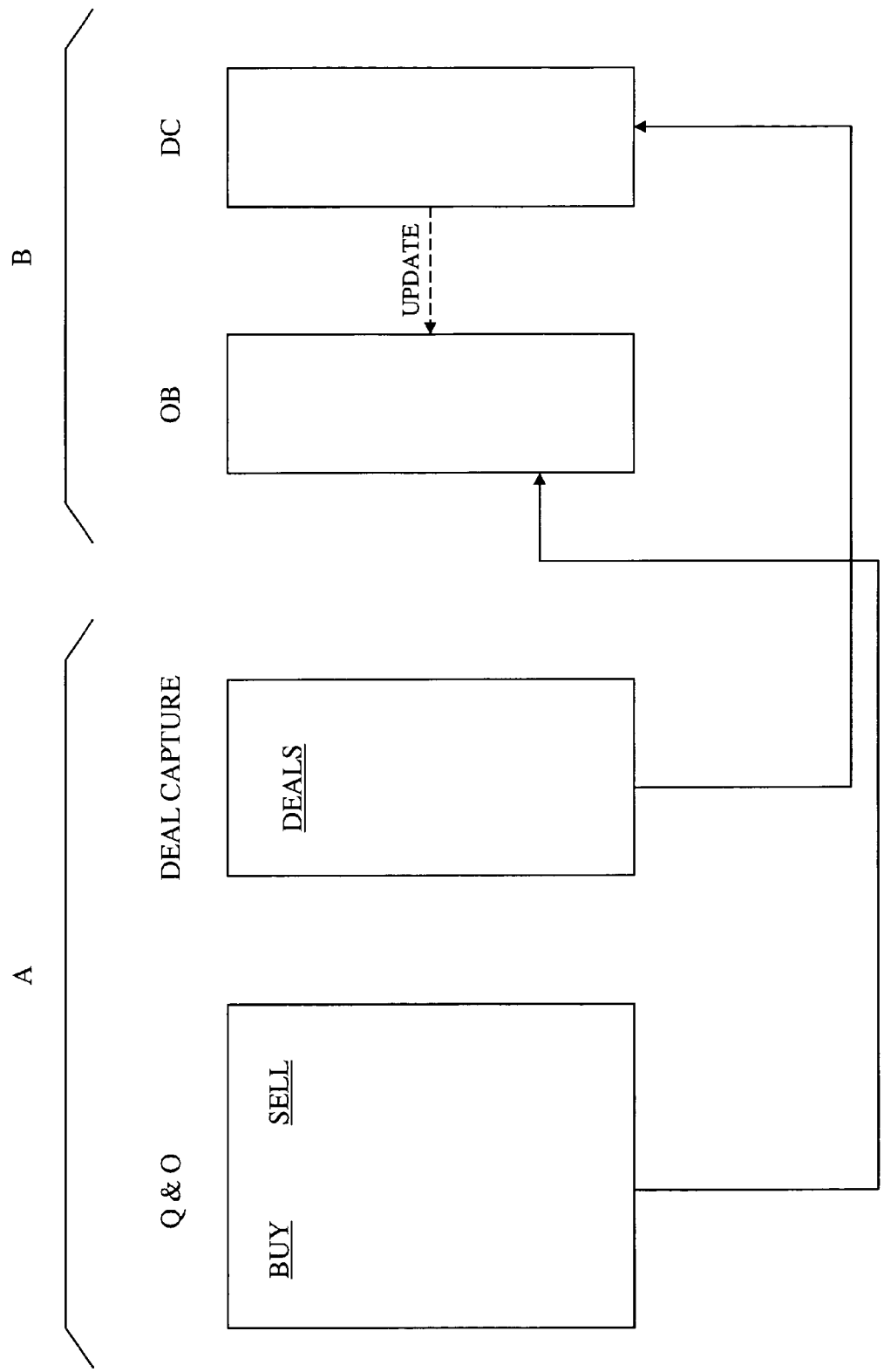

The transfer of the information mentioned to site "B" can be done in a number of different ways. It is not of central importance to the invention which way is chosen, but two methods which can be mentioned are the "Y" and the "L" methods, described in more detail below:

The "Y"-method is the one shown in FIGS. 1a and 1b, and entails all information being sent from the source or sources to all destinations, in this case both "A" and "B". The source or sources mentioned would thus be market makers (quotes and/or orders) and private investors or brokers (orders). The "L"-method entails "A" receiving the information from the source or sources, and forwarding it to "B".

In the "Y"-method, it could be preferred to have identical functions at both "A" and "B", since site "B" will receive the "raw" information. If site "B" were given functions identical to "A", the same results would be reached, and could thus be stored at "B". In the "L"-method, A instead transfers some or all of the results of its functions to "B".

Regardless of which information transfer method that is chosen, "B" will thus have a set of the orders received by "A" and of the deals made at "A". As mentioned, the information regarding the deals stored at "B" is used to update the information regarding the orders at "B", which will be explained in more detail below.

A number of cases can be identified:

A new order is received, which does not match any existing order or quote. The order is inserted into the order book at both A and B.

A new quote is received, which does not match any existing orders or quotes. The new quote is inserted into the order book at A.

A new quote is received, which matches an existing quote in the order book. The corresponding deal is made, the order book at A is adjusted, and the deal is stored at both A and B, in the list previously referred to as "Deal Capture".

A new quote is received, which matches an existing order in the order book. A deal is made, and the order book at A is adjusted. The "Deal Capture"-list is updated at both A and B.

A new order, O1 is received, which matches an existing order, O2 in the order-book. A deal is made, and the order book at A is adjusted. The "Deal Capture"-list is updated at both A and B.

As will be noted, the only order information which is stored at "B" in a system according to the invention is that regarding outstanding orders, i.e. orders which have not yet resulted in deals. However, information regarding the deals also needs to be stored at "B", which is done keeping the "Deal Capture"-list at B updated with the corresponding list at "A".

Thus, at "B" there will be an "order only book" (referred to as OB in the drawings), comprising orders but not quotes, and "deal capture" information (DC), and the said information at "B" will always correspond to the same information at "A". Quote information is not transferred to "B". However, a mechanism is provided for updating the order information at "B" using the deal information at "B".

A number of different mechanisms could be used for this purpose, all of them suitably being computer based, i.e. a computer equipped with the proper program for the mechanism chosen. One principle, shown in FIG. 1a, is to have a corrective function or "update" function which would monitor the information going to the "Deal Capture"-list at "B", and then use this information to update the "order only book" information at "B". This "update" function is shown in FIG. 1a with broken lines on the connection to the "Deal Capture"-list at "B".

The function of the "update" or corrective function is as follows: deals (at both of the sites, since they are identical) comprise information by which they can be identified, e.g. information regarding the underlying quotes and/or orders on which they were based. In addition, the deal information might comprise the identity of the buyer and seller, the identity of the commodity involved in the deal, and the volume of said commodity.

Thus, the corrective function, which suitably is computerised, can use this information in order to go through the deal information going to "B", and update orders stored at "B" (possibly involving removal of the entire order, where applicable), and on which the deals in the deal information coming to "B" have been based.

As an alternative to this, shown in FIG. 1b, the information regarding the deals is first stored in the "Deal Capture"-list at "B", and the corrective function ("update"-function) will then monitor this list in order to use the information stored there to update the "order only book" at B. This alternative is shown in FIG. 1b. This function carries out its purpose immediately upon reception of the deal information or at regularly scheduled intervals.

In addition, a number of other ways of using the deal information to update the order information at "B" can be envisioned. One such way would be to let the order information to "B" pass via the deal information stored at "B" before the order information is stored at "B". In this way, obsolete orders could be weeded out or updated.

Another alternative way would be to store copies of the orders and deals of "A" at "B", and to then at defined intervals let, for example, a computer go through the orders against the background of the deals.

In case of a failure or malfunction of site A, an operator or an automated function at site B will make the determination that site A has been "lost", and that site B should take over operation as the primary site. A message will then be sent to all Market Makers (and traders if they are allowed to submit quotes), which informs them of the necessity of submitting new quotes for all instruments.

Figure 2:
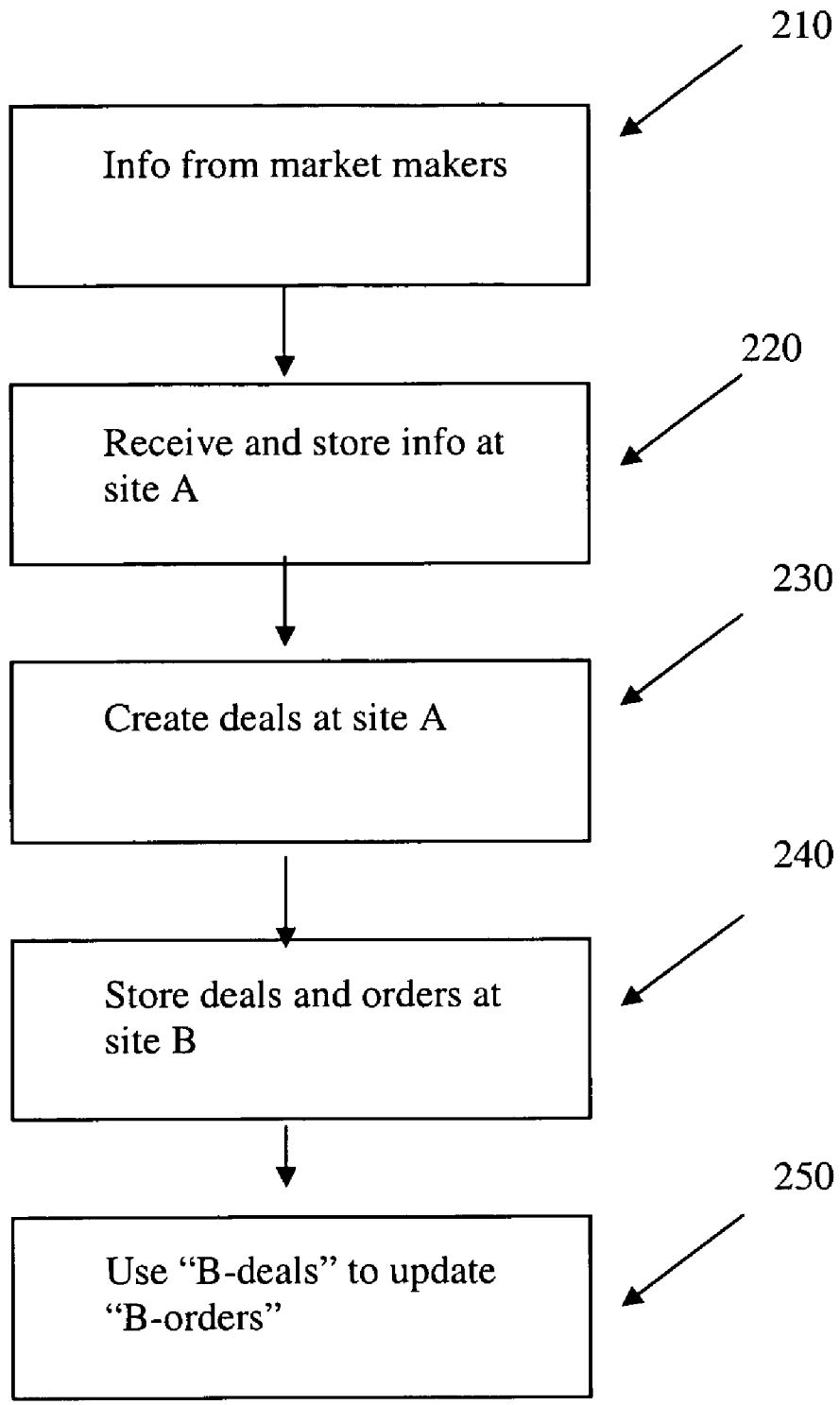
FIG. 2 shows a schematic flowchart of an example method.

In FIG. 2, a flowchart is shown of possible sequence of events.

- Block 210: At a primary site for the trading of securities, "A", information is received from one or more market makers (quotes) and/or traders (orders and possibly quotes). Suitably, the information is received in an electronic manner, e.g. via computer communication.
- Block 220: The information received is stored at the primary site "A", preferably in an electronic memory.
- Block 230: Using the information received at site A, deals are created between orders which match another order or one side (buy/sell) of a quote, or between quotes whose opposite sides (buy/sell) match each other.
- Block 240: The orders which were received at A are also stored at a secondary site, "B", as well as the deals which have been made at "A".
- Block 250: An automated corrective function at "B", or between "A" and "B", preferably implemented on a computer, uses information regarding the deals which have been received at "B" to update the orders at "B".

The automated corrective function mentioned above, which is used at site "B", the "fail-over" site, in order to update the "order only book" maintained at "B" is suitably implemented on a computer, and can function in the following manner:

The deals (at both of the sites, since they are identical) comprise information by which they can be identified, e.g. information regarding the underlying quotes and/or orders on which they were based. In addition, the information might comprise the identity of the buyer and seller, the identity of the commodity involved in the deal, and the volume of said commodity.

Thus, an automated function, suitably a computerised such function, goes through the deals stored at "B" using the information mentioned above in order to update the "order only book" at "B" immediately (upon reception of deal information at "B"), or possibly at defined intervals, and updates orders stored at "B" (possibly involving removal of the entire order, where applicable), and on which deals have been based, said deals having been stored at "B" since the last update.

Figure 3:
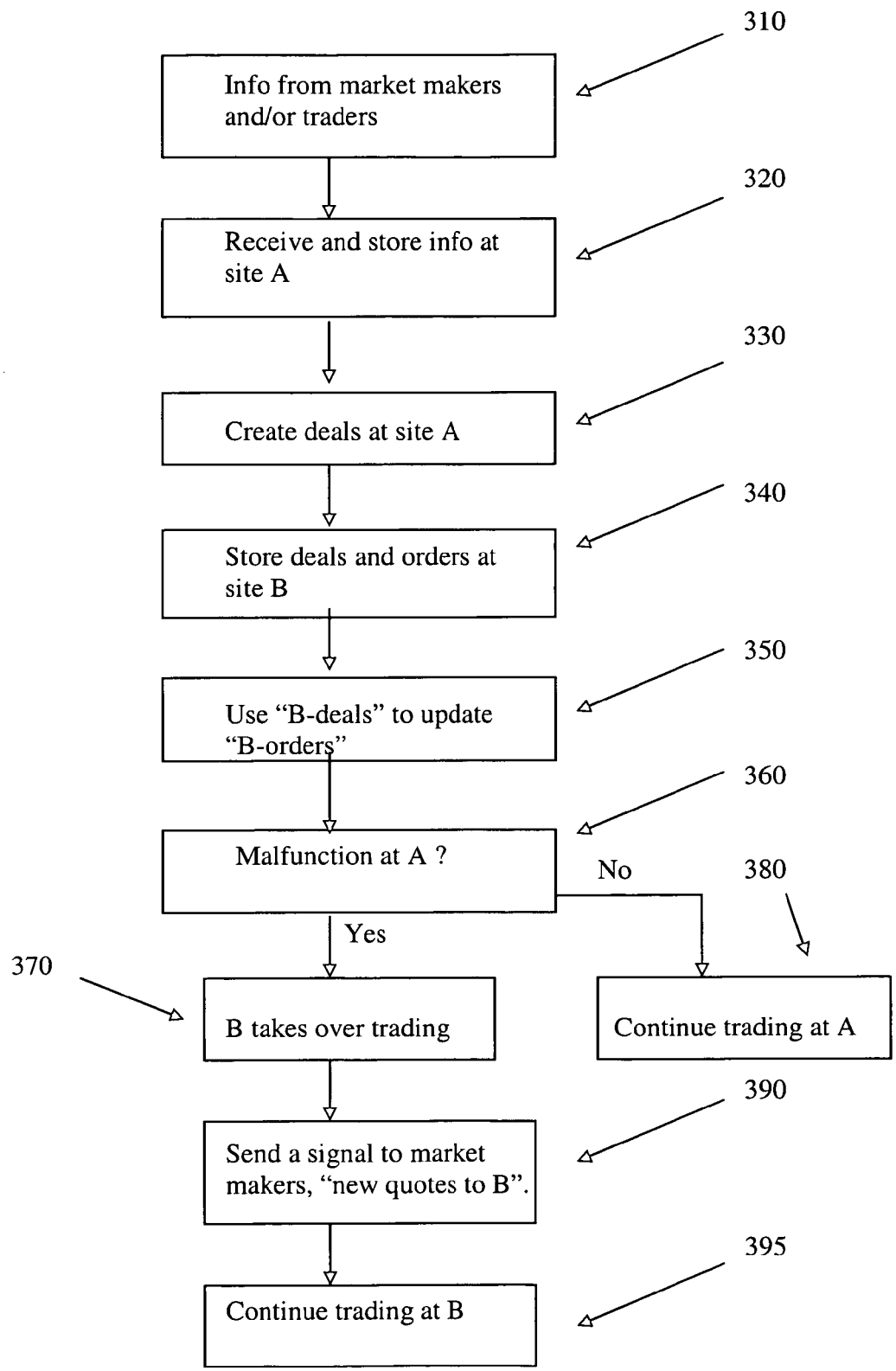
FIG. 3 is a schematic flowchart which shows how trading is transferred to B in the case of a malfunction at A.

FIG. 3 shows a schematic flowchart of a possible sequence of events.

- Block 310: At a primary site for the trading of securities, "A", information is received from one or more market makers (quotes) and/or traders (orders and possibly quotes). Suitably, the information is received in an electronic manner, e.g. via computer communication.
- Block 320: The information received is stored at the primary site "A", preferably in an electronic memory.
- Block 330: Using the information received at site A, deals are created between orders which match another order or one side (buy/sell) of a quote, or between quotes whose opposite sides (buy/sell) match each other.
- Block 340: The orders which were received at A are also stored at a secondary site, "B", as well as the deals which have been made at "A".
- Block 350: An automated corrective function at "B", or between "A" and "B", preferably implemented on a computer, uses information regarding the deals which have been received at "B" to update the orders at "B".
- Block 360: An automated (preferably) or manual function checks if there has been a malfunction at "A" such that the trading cannot be handled at "A".
- Block 380: If there are no such malfunctions at "A", trading continues at "A".
- Block 370: If there is a malfunction such that the trading can no longer be handled by the system at "A", the "B"-site takes over the trading.
- Block 390: A function in the system, preferably an automated function, sends a message to all market makers and traders who have the right to submit quotes to the system, that new quotes for all instruments should be submitted, this time to the "B"-site. As an alternative, the message transmitted could simply be that new quotes should be submitted, with an automated function in the system handling the fact that the quotes should now be routed to "B" instead of to "A".
- Block 395: Trading is then continued at "B".

All the necessary information for the "hand-over" described above is already present at "B", since it has been stored there. The only remaining information necessary for "B" to take over is the quotes, new quotes now need to be sent to B. As mentioned previously, quotes are usually updated quite frequently, regardless of which site that handles the trading, so this does not really require any extra effort on behalf of those submitting the quotes.

Although described and illustrated with the use of example embodiments involving financial instruments, it should be pointed out that the technology could equally well be applied to other kinds of trading, e.g. electricity, commodities etc.

It should also be mentioned that although only two configurations ("L" and "Y") for the "A"-"B" communication have been shown above, the technology can equally well be applied to other configurations, and larger number of fail-over sites. The system could the use configurations such as ring or "W"-configurations, etc.

The invention claimed is:

1. A method, comprising:

trading in securities at a primary site that includes a primary site computer according to information received from market makers and traders, said information comprising quotes from market makers and orders from traders for one or more instruments, wherein the primary computer is arranged to communicate over a communications link with a secondary site computer located at a secondary site different from the primary site;

receiving and storing of said information at the primary site computer;

using said information to create deals in said instruments, said deals also being stored at the primary site computer; and transmitting from the primary site computer to the secondary site computer replicas of the orders and the deals, but not transmitting from the primary site computer to the secondary site computer replicas of each of the quotes.

2. The method of claim 1, further comprising the step of storing at the secondary site computer replicas only of orders which have not yet resulted in deals.

3. An automated system comprising:
a primary site for trading in securities and including a primary site computer programmed to:
receive information from market makers and traders, said information comprising quotes from market makers and orders from traders for at least one instrument,
store said information in memory at the primary site associated with the primary site computer,
create deals using said received information and store said deals in the memory at the primary site, and
transmit from the primary site computer to a secondary site computer located at a secondary site physically separate from the primary site replicas of the orders and the deals, but not transmit from the primary site computer to the secondary site computer replicas of each of the quotes.

4. The system of claim 3, further comprising:
the secondary site including the secondary site computer, wherein the secondary site computer is programmed to store replicas of the deals created at the primary site in a memory at the secondary site associated with the secondary site computer and store replicas only of orders which have not yet resulted in deals.

5. A method comprising:
carrying out automated trading of securities using a primary site computer located at a primary site according to information received from market makers and traders, said information comprising quotes from market makers and orders from traders for one or more instruments, wherein the primary computer is arranged to communicate over a communications link with a secondary site computer located at a secondary site geographically remote from the primary site;
receiving and storing said information at the primary site computer;
the primary site computer using said information to create deals in said securities, said deals being stored at the primary site computer;
transmitting from the primary site computer to the secondary site computer replicas of the orders and the deals, but not transmitting from the primary site computer to the secondary site computer replicas of each of the quotes; and
storing at the secondary site computer replicas of the orders and deals,
wherein trading of securities is continued at the secondary site in case of a malfunction at the primary site, in which case the market makers and traders are prompted to submit new quotes to the secondary site.

6. The method of claim 5, further comprising the secondary site computer using a corrective function and the deals stored at the secondary site computer to update the orders stored at the secondary site computer.

7. The method of claim 5, wherein an operator or the secondary site computer makes the determination that there has been a malfunction at the primary site, and that the trading should be continued at the secondary site.

8. The method of claim 5, wherein the replicas stored at the secondary site computer are based on information received at the secondary site directly from the market makers and traders.

9. An automated system comprising:
a primary site for trading in securities including:
automated means for receiving information from market makers and traders, said information comprising quotes from market makers and orders from traders for at least one instrument,
automated means for storing said information at the primary site,
automated means for creating deals using said received information,
automated means for storing said deals at the primary site, and
automated means for transmitting from the primary site to the automated means located at a secondary site physically separate from the primary site replicas of the orders and the deals,
wherein the automated means for transmitting is configured not to transmit from the primary site to the automated means located at a secondary site replicas of each of the quotes.

10. The system of claim 9, further comprising:
the secondary site,
wherein the secondary site automated means is configured to store replicas of the deals created at the primary site and store replicas only of orders which have not yet resulted in deals.

11. The system of claim 9, further comprising automated means for transmitting from the primary site to the secondary site the information on which the replicas at the secondary site are based.

12. The system of claim 9, further comprising automated means at the secondary site for receiving information directly from the market makers and traders on which the replicas stored at the secondary site are based.

13. An automated corrective method for use in an automated system for trading in securities, comprising:
passing system information regarding orders from traders and deals for one or more instruments from a primary trading site computer trading securities to a secondary site computer located at a secondary site linked to the primary trading site by a communications link, but not passing from the primary trading site computer to the secondary site computer quotes from market makers for the one or more instruments,
storing the system information at the secondary site in a memory associated with the secondary site computer, and
the secondary site computer using the deal information passed to the secondary site computer to update the order information stored at the secondary site computer.

14. The automated corrective method of claim 13, said method being used to monitor the information regarding deals stored at the secondary site computer in order to update the information regarding orders stored at the secondary site computer.

15. The automated corrective method of claim 13, according to which the order information which is passed to the secondary site computer is passed via the deal information stored at the secondary site computer.

16. The automated corrective method of claim 13, according to which copies of the orders and deals are stored at the secondary site computer, and at defined intervals, said orders are processed based on information associated with said deals.

17. A computer system comprising:
a primary trading site computer located a primary trading site and configured to trade in securities,
a secondary site computer located a secondary site that is remote from the primary trading site,
wherein the primary trading site computer is configured to pass securities trading information regarding orders from traders and deals for one or more instruments from the primary trading site computer to the secondary site for storage at the secondary site,
wherein the primary trading site computer is configured to not pass to the secondary site securities trading information regarding quotes from market makers for the one or more instruments,
wherein the secondary site computer is configured use the securities trading information regarding deals passed to the secondary site to update the order information stored at the secondary site.

18. The computer system of claim 17, wherein the secondary site computer is further configured to monitor the securities trading information regarding deals stored at the secondary site in order to update the securities trading information regarding orders stored at the secondary site.

19. The computer system of claim 17, wherein the primary trading site computer is configured to provide the securities trading information regarding orders to the secondary site via the securities trading information regarding deals stored at the secondary site.

20. The computer system of claim 17, wherein the secondary site computer is configured to store copies of the orders and deals stored at the secondary site, and at defined intervals, process the orders based on information associated with the deals.

* * * * *